United States Patent [19]

Berrebi

[11] Patent Number: 4,983,559

[45] Date of Patent: Jan. 8, 1991

[54] PROCESS FOR PRESULFURIZING WITH PHOSPHOROUS AND/OR HALOGEN ADDITIVE

[75] Inventor: Georges Berrebi, Bourg les Valence, France

[73] Assignee: Europeene de Retraitement de Catalyseurs Eurecat, La Voulte sur Rhone, France

[21] Appl. No.: 375,431

[22] Filed: Jul. 3, 1989

[30] Foreign Application Priority Data

Jul. 1, 1988 [FR] France ............................. 88 09049
Mar. 15, 1989 [FR] France ............................. 89 03501

[51] Int. Cl.$^5$ .................. B01J 27/30; B01J 27/188; B01J 27/132; B01J 27/047

[52] U.S. Cl. ........................... 502/32; 208/111; 208/216 R; 502/31; 502/62; 502/85; 502/162; 502/168; 502/169; 502/210; 502/211; 502/213; 502/219; 502/220; 502/221; 502/222; 502/223; 502/228

[58] Field of Search .............. 503/31, 32, 210, 211, 503/220, 219, 228, 168, 162, 62, 85

[56] References Cited

U.S. PATENT DOCUMENTS

| | | | |
|---|---|---|---|
| 3,692,694 | 9/1972 | Kravitz et al. | 502/228 |
| 4,530,917 | 7/1985 | Berrebi | 502/219 |
| 4,719,195 | 1/1988 | Toulhoat et al. | 502/219 |
| 4,725,569 | 2/1988 | Tuszynski et al. | 502/168 |
| 4,775,652 | 10/1988 | Aldag Jr. et al. | 502/168 |

*Primary Examiner*—Paul E. Konopka
*Attorney, Agent, or Firm*—Millen, White & Zelano

[57] ABSTRACT

Presulfurization of a catalyst used, e.g., for hydrocarbon conversion, wherein a polysulfide is employed as the sulfurization agent. In the first stage of the presulfurization, phosphorous, a halogen, or compounds thereof are introduced.

5 Claims, No Drawings

PROCESS FOR PRESULFURIZING WITH PHOSPHOROUS AND/OR HALOGEN ADDITIVE

BACKGROUND OF THE INVENTION

This invention relates to the presulfurization of catalysts.

It will be recalled briefly that often the sulfurizing agent used by refiners is, in prior art, either hydrogen sulfide that is pure or diluted with hydrogen or gaseous hydrocarbons, or also dimethyl disulfide diluted with hydrogen, or other sulfur compounds such as alkyl sulfides or alkyl mercaptans, diluted with hydrogen (see U.S. Pat. No. 4,172,027).

The metals of catalysts used in refining, hydrorefining or in petrochemistry, whether they be new or regenerated, are most often in oxidized form, at times in metal form (for some metals of reforming catalysts in particular). The metals of these catalysts, often being active only in sulfurized or at least partially sulfurized form, it is necessary therefore for the refiner or the petrochemist to perform a sulfurizing of the catalyst prior to its use.

As explained above, regeneration of the catalysts is increasingly performed by a specialist in the regeneration of catalysts, at times far from the industrial unit. It seems reasonable to think of restoring to the refiner a product ready for use, which was made possible by the efficient processes of the applicant of U.S. Pat. Nos. 4,530,917, 4,719,195 or EP-B-181,254) in which a sulfur compound is incorporated in the catalytic compound, said compound, causes the sulfurizing or the presulfurizing of the catalyst when, subsequently, in the reaction zone (zone for treating the charge) or in the immediate proximity of the reaction zone, the catalyst will be put into contact, for example, with hydrogen.

More precisely, in European patent EP-B-181,254, the sulfurizing process of the catalyst is characterized by a preliminary stage of incorporation in the catalytic compound of a sulfur compound, of a specific nature.

The preliminary stage of introduction of a sulfur compound, that arbitrarily is called "off-site" or "ex situ," whether it be performed close to the site of the industrial unit or at a more or less geographically great distance from the industrial unit (where the catalyst has been regenerated or where it has been manufactured, for example) is in any case no longer done in the immediate vicinity of the reactor (arbitrarily written "in situ"), i.e. at the head of the reactors or in the zones more or less directly connected with these reactors, necessitating operation under operating conditions (temperature, pressure or others), imposed at least in part by the operating conditions of the reactors themselves or the accessory zone of these reactors (preliminary hydrogenation zone of the catalyst, for example).

The process of EP-B-181,254 makes it possible, to intiate, when the catalyst is subjected from its start preferably on site ("in situ"), to the standard activation reaction in the presence of hydrogen (generally above 100° C.) to initiate, as a result of the presence of hydrogen on the site, sulfurizing at the rate required either, stoichiometric or non-stoichiometric, one or more active metals entering the composition of the catalyst. The process involves incorporating in a first stage, in the absence of hydrogen, in the porosity of the new or regenerated catalyst at least one sulfurizing agent, the sulfurizing agent being a polysulfide of the general formula:

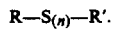

Said sulfurizing agent is used in solution in a solvent.

In the second stage, performed "in situ," and preferably above 150° C., an activation stage of the catalyst performed in the presence of hydrogen is initiated, the amount of sulfur required being fixed, thanks to the presence of hydrogen, on the metal or metals entering the composition of said catalyst.

In the polysulfide of the formula:

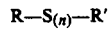

$n$ is an integer from 3 to 20, preferably from 4 to 8 and more particularly from 5 to 7; R and R', identical or different, represent organic radicals each containing 1 to 150 carbon atoms per molecule, preferably either 10 to 60 carbon atoms or 5 to 40 carbon atoms and more particularly 7 to 16, these radicals being chosen from the group consisting of alkyl radicals, i.e. saturated or unsaturated, linear or branched or of naphthenic type, aryl radicals, alkylaryl radicals and arylalkyl radicals, these various radicals may also contain at least one heteroatom. R' optionally also can be a hydrogen atom.

As a preferred example of polysulfide, the ditertiododecyl polysulfide (n=5) where R and R' are each a dodecyl radical can be cited.

This product is marketed for example by ELF AQUITAINE under the name TPS 32, particularly because it contains about 32% by weight of sulfur.

Ditertiononyl polysulfide (n=5) where R and R' are each a tertiononyl radical also can be cited.

This product is marketed by ELF AQUITAINE under the name TPS 37, particularly because it contains about 37% by weight of sulfur or by PENNWALT under the name TNPS.

For reasons of procedure, these sulfurizing agents of polysulfide type obviously can be used alone or as a mixture, in proportions chosen judiciously.

The first stage mentioned above is performed in the absence of hydrogen and makes it possible to obtain with very great precision the degree of total or partial sulfurizing requested by the user. This incorporation of sulfur is performed between 0° and 50° C. and preferably between 10° and 35° C. and preferably still at ambient temperature.

The sulfurizing agent is used, diluted in a suitable solvent which depends particularly on the nature of the sulfurizing agent, i.e. on R and R', radicals which determine the content of sulfur incorporated in the catalyst generally by capillary action or by porosity. The sulfurizing processes actually vary according to the cuts to be treated subsequently in the presence of catalysts treated according to the invention.

At the end of this first stage, a second stage is initiated which is divided into two parts:

The first part of this second stage is performed in situ or ex situ. The first part of the second stage is performed in the absence of hydrogen. It is performed in the presence of air or an inert gas. According to a preferred method, it is performed in the presence of at least steam or at least moist air or a moist inert gas during at least about 5 minutes, "in situ" or "ex situ" at a temperature between 65° and 270° C. under a pressure between about 0.5 and 70 bars (0.05 and 7 MPa), the catalyst then being dried.

Subsequently, on site or in the proximity of the site (on which the catalyst will be used for the treatment of various charges), at the time of the standard activation reaction, performed in the presence of hydrogen (second stage of the process of European patent application EP-B-181,254), the sulfurizing agent, introduced in the catalyst in predetermined amounts, will be capable of producing hydrogen sulfide which, in the presence of hydrogen, will lead to the desired sulfide or sulfides of the metal or metals present in the catalyst.

Preferably, the operation can take place for at least 5 minutes and preferably at most 10 hours between 65° and 265° C., under a pressure between 0.5 and 70 bars (0.05 and 7 MPa), preferably between 85° and 260° C. and more particularly between 95° and 150° C.

When working in the presence of steam, the latter should be superheated to at least 110° C.

When operating in the presence of moist inert gas or moist air, it is advisable to operate with a relative humidity on the order of 2 to 60% by volume at the drying stage, and at a temperature between 105° and 200° C., preferably between 110° and 170° C. A gas also can be used whose water content is between 50 and 100% (pure steam), preferably between 90 and 100% and operated between 5 minutes and 10 hours under 0.05 to 7 MPa at a temperature lower than 200° C., preferably lower than 170° C.

During the second stage, the catalyst is brought to a temperature equal to at least 275° C., for at least 1 minute.

The second part of the second stage generally is performed in situ and therfore can merge with the starting or the running itself of the refining and petrochemical reaction for which the catalyst prepared according to this invention is designed, in the case where precisely such a reaction is performed above 275° C.

When the temperature chosen for the refining or petrochemical reaction is lower than 275° C. (for example, this can be the case of hydrodesulfurizing of gasolines or kerosenes), it then is sufficient to lower the temperature used for activation of the catalyst in the second part of the second stage after this stage to the temperature appropriate for the refining or petrochemical reaction.

It has been found that in the first part of the second stage, despite the absence of hydrogen, the catalyst is sulfurized, i.e., the oxides of active metals of the catalyst, are converted into sulfides. This phenomenon is easily observed by analysis of the catalyst, which furthermore becomes black. On the other hand, chemisorption tests show that as long as the catalyst does not reach the temperature of 275° C. and does not remain at least several minutes at at least 275° C., this catalyst remains without catalytic activity.

SUMMARY OF THE INVENTION

The invention relates to the introduction of at least one additive with halogen or phosphorus base during such a presulfurizing method described above. Specifically the invention relates to a process of introduction of at least one additive with, a halogen or phosphorus base during a process of treatment in two stages of a new or regenerated catalyst containing (a) a support with a base of at least one oxide of a metal or a metalloid and (b) at least one active metal by, process of treatment in which, in a first stage performed "ex situ" between about 0° and 50° C. and in the absence of hydrogen, the catalyst is treated with at least one sulfurizing agent to incorporate this agent partially or totally in the porosity of the catalyst, the sulfurizing agent being a polysulfide of the general formula:

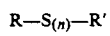

$$R-S_{(n)}-R'$$

where n is an integer from 3 to 20 and where R' represents a hydrogen atom or another radical identical or different from radical R, these two radicals thus each representing an organic radical containing 1 to 150 carbon atoms per molecule, these radicals being chosen from the group consisting of alkyl radicals, i.e., saturated or unsaturated, straight or branched or of naphthenic type, aryl radicals, alkylaryl radicals and arylalkyl radicals, said sulfurizing agent being used in solution in a solvent, the catalyst then being optionally dried, a process in which then, in a second stage, the catalyst obtained in the first stage is treated, in the absence of hydrogen and in the presence of at least steam or at least a moist inert gas or moist air for at least about 5 minutes, "in situ" or "ex situ," at a temperature between 65° and 275° C., under a pressure between about 0.5 and 70 bars (0.05 and 7 MPa), the catalyst at this stage optionally being dried before its use in refining. The process of additive introduction is characterized in that during the first stage, an addition by weight, (weight expressed in halogen or phosphorus), is made relative to the weight of polysulfide or polysulfides, 0.1 to 10%, preferably 1 to 6% and more particularly 2 to 5% of at least one additive chosen from the group consisting of phosphorus, phosphorus compounds, halogens and halogen compounds.

The invention is particularly well suited for catalysts for cracking and hydrocracking hydrocarbons and more generally for the reactions of conversion of hydrocarbons and for the refining operations.

The process according to the invention involves the first part of the first stage being performed in the presence of at least steam or at least a moist inert gas, particularly moist air.

By weight, advantageously 0.5 to 20% by weight of the additive or additives incorporated in the catalyst the desired amount of the additive being considered will be used.

The additive or additives can be added, for example, with the solution of the polysulfide or polysulfides used, either in the pure state, or dissolved in a suitable solvent. This solvent can be of the same type as the solvent chosen to dissolve the polysulfide, namely, for example:

a light gasoline boiling for example between about 60° to 95° C., a hexane type gasoline boiling between about 63° and 68° C., an F type gasoline boiling between about 100° and 160° C. and generally containing 10 to 20% aromatic hydrocarbons, for example 15% (by volume), a "mineral spirits" type gasoline boiling between about 150° and 250° C. and generally containing 14 to 22% aromatic hydrocarbons, for example 17%, by volume, any cut, hydrocarbon or non-hydrocarbon, equivalent to the preceding gasolines.

The organic halogen and/or phosphorus compound or compounds according to the invention can be used in another suitable solvent such as, for example, water, alcohols (methanol, ethanol, propanol, etc.) or other inorganic or organic liquids known for dissolving the additives chosen, if the solvent chosen is compatible with the other products or solvents used in the process.

As a halogen additive, chlorine, bromine, fluorine and iodine, hydrochloric acid, hydrobromic acid, hydrofluoric acid, hydroiodic acid or any other halogen compound, for example a compound chosen from the group consisting of halogens of hydrocarbylaluminum of general formula Al Rx Xy where R represents a hydrocarbon group containing for example up to 12 carbon atoms such as alkyl, aryl, aralkyl, alkaryl, cycloalkyl, X representing a halogen (chlorine or bromine in particular) and x having a value from 1 to 1.5, y having a value from 1.5 to 2, preferably with $x=1$, $y=2$, with $x+y=3$ (as examples of such compounds, ethylaluminum sesquichloride, dichloroethylaluminum, dichloroisobutylaluminum and dibromomethylaluminum can be mentioned in particular) advantageously will be used. Halocarboxylic acids of formula R1 COOH in which R1 is a halogen alkyl radical also can be used, particularly those which contain at least one halogen atom in the alpha position to the COOH group with, on the whole, 2 to 10 carbon atoms per molecule. A class of acids able to be used includes the halocarboxylic acids of formula R'1 COOH in which R'1 is a haloalkyl radical containing 1 to 3 carbon atoms, of formula Cm Hp Xq where X is a halogen (fluorine, chorine, bromine, iodine), $m=1,2$ or 3, p is equal to zero or an integer, q is an integer, with for example the condition that $p+q=2m+1$. A haloacetic acid of formula R2 COOH in which R2 is a haloethyl radical of formula CXn H3-n where X is fluorine, chlorine, bromine or iodine with n from 1 to 3 also will be used in particular. There can be mentioned as usable: trifluoroacetic, difluoroacetic, monofluoroacetic, trichloroacetic, dichloroacetic, monochloroacetic, tribromoacetic, dibromoacetic, monobromoacetic, triiodoacetic, diiodoacetic, monoiodoacetic, pentafluoropropionic, fluor-2-propionic, dichloro-2-propionic, chloro-2-propionic, heptafluorobutyric, fluoro-2-butyric or chloro-2-butyric acids. The preceding examples are not limiting.

Halogens, aryl, alkylaryl and aralkyl of alkyl radicals containing for example 1 to 6 carbon atoms per molecule also can be used: there can be mentioned methyl chloride, methylene chloride, chloroform, carbon tetrachloride, dichloroethane etc. Various halogen compounds, for example thionyl chloride, nitrosyl chloride, hexafluoroacetylacetone, 2-thenoyltrifluoroacetone-TTA, trifluoroacetylacetone also can be used. Also to be cited as nonlimiting example are alphachloralose, beta-chloralose, chloramine-B hydrate, chloramine-T hydrate, chloramphenicol, tetrachlorobenzoquinone, chloroacetaldehyde, chloroacetaldehyde diethyl acetal, chloroacetaldehyde dimethyl acetal, 2-chloroacetamide, chloroacetone, chloroacetonitrile, 2-chloroacetophenone, 2'-chloroacetophenone, 3'-chloroacetophenone, 4'-chloroacetophenone, chloroacetyl chloride, 2-chloroacrylonitrile, 2-chloroaniline, 3-chloroaniline, 4-chloroaniline, 3-chloroanisole, 4-chloroanisole, 1-chloroanthracene, 2-chloroanthracene, 2-chlorobenzaldehyde, 4-chlorobenzaldehyde, chlorobenzene, 4-chlorobenzenesulfonamide, 2-chlorobenzoic acid, 3-chlorobenzoic acid, 4-chlorobenzoic acid, 2-chlorobenzoic hydrazide, 4-chlorobenzoic hydrazide, 2-chlorobenzonitrile, 3-chlorobenzonitrile, 4-chlorobenzonitrile, 2-chlorobenzophenone, 3-chlorobenzophenone, 4-chlorobenzophenone, 2-chlorobenzothiazole, 4-chlorobenzotrichloride, 2-chlorobenzotrifluoride, 4-chlorobenzotrifluoride, 2-chlorobenzoyl chloride, 3-chlorobenzoyl chloride, 4-chlorobenzoyl chloride, 4-chlorobenzylamine, 2-chlorobenzyl bromide, 3-chlorobenzyl bromide, 2-chlorobenzyl chloride, 2-chlorobenzyl chloride, 4-chlorobenzyl chloride, 2-chlorobenzyl cyanide, 3-chlorobenzyl cyanure, 4-chlorobenzyl cyanide, 2-(4-chlorobenzyl) pyridine, 4-(4-chlorobenzyl) pyridine, 1-chlorobutane, 2-chlorobutane, 4-chloro-1-butane, 3-chloro-2-butanone, 2-chloro-2-butene, 4-chlorobutyric acid, 4-chlorobutyronitrile, 4-chlorobutyrophenone, 4-chloro-2-butyrothienone, 4-chlorobutyrothienone, 4-chlorobutyryl chloride, 3-chloro-2-chloromethyl-1-propene, 2-chlorocinnamic acid, 3-chlorocinnamic acid, 2-chlorocyclohexanol, 1-chlorodecane, 4-chloro-2,6-diaminopyride, chlorofluoroacetic acid, 1-chloro-2,4-dinitrobenzene, 1-chloro-3,4-dinitrobenzene, 2-chloroethanesulfonic acid, 2-chloro-1-ethanesulfonyl chloride, 2-chloroethanol, 2(2-chloroethoxy)ethanol, N(2-chloroethyl)acetamide, chloroethylene carbonate, 2-chloroethyl ether, 3-chloro-4-fluoroaniline, 4-chloro-2-fluoroaniline, 2-chloro-6-fluorobenzal chloride, 2-chloro-6-fluorobenzaldehyde, 1-chloro-3-fluorobenzene, 2-chloro-6-fluorobenzyl alcohol, 2-chloro-6-fluorophenylacetic acid, 2-chloro-6-fluorophenylacetonitrile, 2-chloro-4-fluorotoluene, 2-chloro-6-fluorotoluene, 4-chloro-2-fluorotoluene, 1-chloroheptane, 1-chlorohexadecane, 1-chlorohexane, 6-chloro-1-hexanol, chlorohydroquinone, 5-chloro-2-hydroxyaniline, 5-chloro-2-hydroxybenzamide, chloro-2-iodobenzene, chloroiodomethane, 3-chloro-2-methylaniline, 3-chloro-4-methylaniline, 4-chloro-2-methylaniline, 3-chloro-3-methylpentane, 4-chloro-3-methylphenol, 2-chloro-2-methylpropane, 4-chloro-2-methythiopyrimidine, 1-chlorooctadecane, 1-chlorooctane, 3-chloro-2,4-pentanedione, 1-chloro-3-pentanone, 5-chloro-2-pentanone, 2-chlorophenol, 3-chlorophenol, 4-chlorophenol, 1-chloropropane, 2-chloropropane, 3-chloro-1,2-propanediol, 2-chloro-1-propanol, 3-chloro-1-propanol, chloropropene, 3-chloropropenic acid, 3-chloropropionyl chloride, 3-chloropropyl acetate, 5-chlorosalicylic acid, chlorotetradecane, 4-chlorothiophenol, 2-chlorotoluene, 3-chlorotoluene, 4-chlorotoluene, 2-chloro-m-xylene, 2-chloro-p-xylene, 4-chloro-o-xylene and chlorosulfonic acid.

Also to be cited, as an indication, o-aminobenzofluoride, m-aminobenzofluorone, p-aminobenzofluoride, 3-amino-4-chlorobenzotrifluoride, 5-amino-2-chlorobenzotrifluoride, benzoyl-1,1,1-trifluoroacetone, o-bromobenzotrifluoride, m-bromobenzotrifluoride, p-bromobenzotrifluoride, bromochlorodifluoromethane, 1-bromo-2,4-difluorobenzene, o-bromofluorobenzene, m-bromofluorobenzene, p-bromofluorobenzene, carbonyl fluoride, chloride trifluoride, o-chlorobenzotrifluoride, m-chlorobenzotrifluoride, p-chlorobenzotrifluoride, chlorofluoroacetamide, 1-chloro-1,1-difluoroethane, 3-chloro-4-fluoronitrobenzene, 2-chloro-5-nitrobenzotrifluoride, chloropentafluorobenzene, chlorotrifluoroethylene, dibromodifluoromethane, dibromofluoromethane, 1,2 dibromohexafluoropropane, 3,4-dichlorobenzotrifluoride, difluoroacetic acid, 2,4-difluoroaniline, 2,5-difluoroaniline, 2,6-difluoroaniline, o-difluorobenzene, m-difluorobenzene, p-difluorobenzene, 1,1-difluoroethylene, 1,2-difluorotetrachloroethane, 2,4-dinitrofluorobenzene, ethyltrifluoroacetate, p-fluoroacetophenone, o-fluoroaniline, m-fluoroaniline, p-fluoroaniline, o-fluorobenzaldehyde, m-fluoroaldehyde, p-fluorobenzaldehyde, fluorobenzene, o-fluorobenzoic acid, p-fluorobenzoic acid, m-fluorobenzotrifluoride, o-fluorobenzoyl chloride, m-fluorobenzoyl chloride, 4-fluoro-2-methylaniline, p-fluoronitrobenzene, 4-fluoro-2-nitrotoluene, o-fluorophenol, m-fluorophenol, p-fluorophenol, p-fluoropropiophenone, o-fluorotoluene, m-fluorotoluene, p-fluorotoluene, hexafluoro-2-butyne, p-fluoronitrobenzene, 4-fluoro-2-nitrotoluene, o-fluorophenol, m-fluorophenol, p-fluorophenol, p-fluoropripiophenone, o-fluorotoluene, m-fluorotoluene, p-fluorotoluene, hexafluoro-2-butyne, hexafluoroethane, hexafluoropropene, methylfluoride, 1,1,2-trichlorotrifluoroethane, 1,1,1-trifluoroacetone, 2,2,2-trifluoroethanol, trifluoromethanesulfonic acid, m-trifluoromethylbenzaldehyde, p-trifluoromethylbenzaldehyde, o-trifluoromethylbenzaldehyde acid, trifluoromethylbromide and trifluoromethyliodide.

This list is not limiting. Among the additives with a phosphorus base, besides phosphorus, will be cited, as nonlimiting examples: (some preferred compounds also being indicated in the examples) phosphorous acid, phosphoric acid, polyphosphoric acids, 1,2-bis(diethylphosphino)ethane, bis(dimethylphosphino)methane, bis(diphenylphosphino)benzene, (-) (2S,3S)-bis(dipentafluorophenylphosphino)butane, 1,4-bis(diphenylphosphino)butane, 1,2-bis(diphenylphosphino)ethane, cis-1,2-bis(diphenylphosphino)ethylene, 1,3-bis(diphenylphosphino)propane, 1,3-bis(phenylphosphino)propane, cyclohexyldiphenylphospine, diethylphosphine, dimethylphenylphosphine, diphenylenephenylphosphine, diphenylphosphine, ethyldiphenylphosphine, methyldiethoxyphosphine, methyldiphenylphosphine, phenyldimethoxyphosphine, phenylphosphine, tetramethylbiphosphine, tetramethylbiphosphine disulfide, tetraphenyldiphosphine disulfide, p-tolydiphenylphosphine, triallylphosphine, tri-n-butylphosphine, tri-t-butylphosphine, tri(m-chlorophenyl)phosphine, tri(p-chlorophenyl)phosphine, tricyclohexylphosphine, triethylphosphine, trimethylphosphine, tri(1-naphthyl)phospine, triphenylphosphate, triphenylphosphine, triphenylphosphite, tri-i-propylphosphite, tri-n-propylphosphite, tri(2-cyanoethyl)phosphine, tri(2-dimethylaminoethyl)phosphite, tri(4-dimethylaminophenyl)phosphine, tri(dimethylaminophenyl)phosphine, 1,1,1-tri(diphenylphosphinomethyl)ethane, 1,1,1-tri(diphenylphosphino)methane, tri(p-fluorophenyl)phosphine, tri(o-methoxyphenyl)phosphine, tri(p-methoxyphenyl)phosphine, tri(p-trifluoromethoxyphenyl)phosphine, tri(trimethylsilyl)phosphine, tri-o-tolyphosphine, tri-m-tolyphosphine, tri-p-tolyphosphine, vinyldiphenylphosphine, allyldiphenylphosphonium bromide, aminotri(methylenephosphonic) acid, amyltriphenylphosphonium bromide, benzyltriphenylphosphonium chloride, bis(dimethylamino)phosphoryl chloride, 1,2-bis(dimethylphosphino)ethane, bis(dimethylphosphino)methane, 1,2-bis(dipentafluorophenylphosphino)ethane, bis(diphenylphosphine)acetylene, 1,2-bis(diphenylphosphine)benzene, 1,4-bis(diphenylphosphine)butane, 1,2-bis(diphenylphosphine)ethane, 1,3-bis(phenylphosphine)propane, bis(triphenylphosphine)iminium nitrate, t-butyldichlorophosphine, cycloexyphosphine, d-n-amylphosphate, dibromotriphenylphosphorane, di-t-butylchlorophosphine, di-n-butylphosphate, dialkylphosphites of type $(RO)_2 POH$ or compounds of formula $(RO)_3 P=O$, by citing also di-n-butylphosphite, dicycloexylphosphine, diethylchlorophosphine, diethylenetriaminepenta (methylenephosphonic acid), di-(2-ethylhexyl) phosphoric acid, diethylphosphite, difluorophosphoric acid hemihydrate, dilaurylphosphate, dimethylmethylphosphonate, diphenylchlorophosphate, diphenylchlorophosphine, diphenylphosphine, diphenylphosphonic chloride, di-n-propylphosphate, di-i-propylphosphite, distearylphosphate, ethyldichlorophosphine, ethyldichlorophosphine, ethylenediaminetetra(methylenephosphonic acid), fluorophosphoric acid, hexamethylenediaminetetra(methylenephosphonic acid), hexamethylphosphoramide, hydrogen hexafluorophosphate, hypophosphoric acid, methyldichlorophosphine, methyldiethoxyphosphine, methyldiphenylphosphine, methyltriphenylphosphonium bromide, orthophosphoric acid, phenyldichlorophosphate, phenyldichlorophosphine, phenylphosphine, phenylphosphonic acid, phosphoric acid, phosphorus bromide, phosphorus chloride, phosphorus fluoride, phosphorus iodide, phosphorus oxide, phosphorus oxybromide, phosphorus oxychloride, polyphosphoric acid, tetra-n-butylphosphonium bromide, tetramethylbiphosphine disulfide, tetraphenylphosphonium bromide, tetraphosphorus trisulfide, thiophosphoryl chloride, p-tolydiphenylphosphine, tri-n-butylphosphine, tri-n-butylphosphite, tricresylphosphate, tricyclohexylphosphine, triethylphosphate, triethylphosphite, triethylphosphonothioate, triethylphosphate, trimethylphosphine, trimethylphosphite, trioctylphosphine oxide, triphenylphosphine, triphenylphosphine oxide, triphenylphosphine sulfide, triphenylphosphite, tri-n-propylphosphine, tri-i-propylphosphite, tri(2-chloroethyl) phosphate, tri(2-chloroethyl)phosphite. This list is not limiting.

EXAMPLES

In the following examples, the impact of the adopted method of presulfurizing of catalyst will be studied for a hydrorefining of a hydrocarbon cut, with addition of halogen and/or phosphorus compounds.

The cut that is proposed to be hydrorefined is a model charge containing by weight:
20% toluene
2% thiophene
78% cyclohexane.

The operating conditions are the following:
Temperature: 350° C.
Total pressure: 60 bars (6 MPa).
VVH (space velocity): 2 liters charge/liter catalyst/hour.
$H_2$/HC: Hydrogen/hydrocarbons: 350 l/h.
Period of treatment: 48 hours.
Volume of the catalyst brought into play: 40 cc in all the examples.

Analysis of the effluents is performed by chromatography in the gas phase. In each test, the activity in hydrogenation ("A") of toluene and activity in isomerization ("I") of the cyclohexane in methylcyclopentane will be measured:

$$A = \text{Log} \frac{1}{1-X}$$

(Natural logarithm) where X is the conversion rate of the toluene, i.e.

$$X = \frac{\Sigma P}{\Sigma T}$$

$\Sigma P$ representing the sum of the molar titers of the conversion products of the toluene (methylcyclohexane, ethylcyclopentane and dimethylcyclopentanes) and $\Sigma T$ representing the sum $\Sigma P$ + residual toluene titer.

X is between 0 and 1, X being equal to 1 for a 100% conversion of toluene.

$$I = 100 \times \frac{\text{Molar titer of methylcyclopentane}}{(\text{Molar titer in methylcyclopentane} + \text{molar titer in residual cyclohexane})}$$

(the activity in isomerization I makes it possible to measure the acidity of the catalyst).

The catalyst used is a commercial catalyst of the Societe Procatalyse HR 346 containing by weight 3% of nickel oxide NiO and 14% of molybdenum oxide $MoO_3$, these compounds of active metals being deposited on an alumina. A commercial catalyst of the Societe PROCATALYSE is also used: HYC 642 containing nickel and molybdenum oxides on a zeolite support.

Other hydrocracking catalysts on zeolite support such as HTY or S 5030 of the SHELL CHEMICAL Company or even HC 14, HC 16 or HC 22 of the UNOCAL Company (catalysts with a base of nickel and molybdenum oxides or nickel and tungsten oxides) have been used particularly.

EXAMPLE 1 comparison

In this example, a sulfurizing of the catalyst by operating according to the method of European patent EP-B-181254 is initiated in two stages:

First stage

For the presulfurizing of the catalyst, TPS 37, manufactured by ELF AQUITAINE and containing about 37% by weight of sulfur, is used (the formula was given in the general part of this patent application); for the entire polysulfide to be absorbed, it is necessary to use a volume of reagent (polysulfide+solvent of the polysulfide) equal to the impregnation volume of the charge of the catalyst treated. Knowledge of this total porous volume, or impregnation volume, determines the amount of solvent to be used. In the context of this test, this volume, for 100 g of catalyst, is 45 ml on an average (including 60% solvent and 40% polysulfide). The solvent used is a mineral spirit (boiling temperature between 150° and 250° C.).

Stoichiometry of sulfur is necessary used subsequently to sulfurize the totality of the oxides (NiO, $MoO_3$) or 7.1% S. The dry impregnation of the catalyst thus is initiated, followed by an evaporation under 10 mm of mercury (13 600 Pa) or under an inert gas stream.

Second stage

The catalyst is introduced in the reactor. The reactor is put under the pressure of a bar in the presence of air. (The same results would be obtained under a higher pressure, for example 60 bars). The catalyst is heated for 1 hour.

A Tc test performed at 150° C. is carried out.

The catalyst becomes black, with deposit of water.

The $SO_2$ in the gas effluents is measured with an infrared analyzer of COSMA trademark.

The sulfur content by weight, in the catalyst after the test, is the following:

% S=5.95

The catalyst then is introduced in the hydrorefining reactor:

The reactor is put under hydrogen atmosphere, at cold temperature. The pressure is brought to 60 bars and the temperature to 150° C.

The hydrorefining tests are performed as follows: the injection of the charge to be converted is initiated then the temperature is brought to 300° C. for 1 hour then to 350° C. for the test.

During the first part of the second stage, the operation also takes place not in the presence of air but with a mixture of 5% by volume of air, on one hand, and 95% by volume of steam initially superheated to 115° C., on the other hand (T'c test).

The results obtained are given in the table below

|   | Tc | T'c |
|---|---|---|
| A | 0.83 | 1.10 |
| I | 0.74 | 1.03 |

EXAMPLE 2 according to the invention

The operation is initiated as in example 1. However, the first stage is performed here in the presence of halogen and/or phosphorus additives.

By weight, 3% of halogen or phosphorus is used relative to the organic polysulfide.

Each of these additives is added in the mineral spirits which acts as a solvent for the organic polysulfide.

The results of the $T_1c$ test (corresponding to Tc in the comparison example) and the $T_1'c$ test (corresponding to T'c in the comparison example) are the following:

|   | $T_1c$ | | $T_1'c$ | |
|---|---|---|---|---|
|   | A | I | A | I |
| $CH_2FCOOH$ | 0.82 | 0.72 | 1.16 | 1.09 |
| $CHCl_2COOH$ | 0.80 | 0.70 | 1.17 | 1.10 |
| $CH_2ClCOOH$ | 0.81 | 0.72 | 1.16 | 1.09 |
| $CBr_3COOH$ | 0.80 | 0.70 | 1.18 | 1.11 |
| $CH_2BrCOOH$ | 0.81 | 0.70 | 1.16 | 1.09 |
| $CH_2ICOOH$ | 0.81 | 0.70 | 1.16 | 1.09 |
| $C_3F_7COOH$ | 0.80 | 0.69 | 1.19 | 1.12 |
| $H_3PO_4$ | 0.78 | 0.62 | 1.15 | 1.07 |
| $H_3PO_3$ | 0.77 | 0.62 | 1.15 | 1.07 |
| $(NH_4)H_2PO_4$ | 0.75 | 0.64 | 1.14 | 1.06 |
| $(NH_4)_2HPO_3$ | 0.76 | 0.63 | 1.14 | 1.06 |
| $(NH_4)H_2PO_3$ | 0.76 | 0.62 | 1.15 | 1.07 |
| $(NH_4)_2HPO_3$ | 0.75 | 0.63 | 1.15 | 1.06 |
| tri-p-tolylphosphine | 0.75 | 0.62 | 1.16 | 1.08 |
| 50% weight $C_3F_7COOH$ 50% weight tri-p-tolylphosphine | 0.77 | 0.60 | 1.23 | 1.17 |

These results show, on one hand, that the art according to the invention is efficient when the first part of the second stage is performed in the presence of water, but on the other hand, that this same art is poor when the operation does not take place in the presence of water and even gives results slightly less than those obtained in EP-B-181254.

I claim:

1. In a process for the sulfurization of a new or regenerated hydrocarbon refining or conversion catalyst containing (a) a support with a base of at least one oxide of a metal or a metalloid and (b) at least one active metal, comprising:

(a) a first stage performed ex situ between about 0° and 50° C. and in the absence of hydrogen, in which the catalyst is treated with at least one sulfurizing agent so as to incorporate this agent partially or totally in the porosity of the catalyst, the sulfurizing agent being a polysulfide of the general formula:

$$R-S_{(n)}-R'$$

where n is an integer from 3 to 20 and where R and R' each represent an organic radical containing 1 to 150 carbon atoms per molecule, chosen from the group consisting of a saturated or unsaturated, straight or branched alkyl radical, a naphthenyl radical, an alkylaryl radical and an arylakyl radical, said sulfurizing agent being used in solution in a solvent, the catalyst then being optionally dried, and (b) a second stage, in which the catalyst obtained in the first stage is treated, in the absence of hydrogen and in the presence of at least steam, moist air or a moist inert gas for at least about 5 minutes, in situ or ex situ, at a temperature between 65° and 275° C., under a pressure between about 0.5 and 70 bars (0.05 and 7 MPa), the catalyst at this stage optionally being dried, the improvement comprising adding, during the first stage, 0.1 to 10% by weight, (weight expressed in elemental halogen or elemental phosphorus), relative to the weight of polysulfide or polysulfides of at least one additive chosen from the group consisting of phosphorus, a phosphorus compound, a halogen and a halogen compound.

2. A process according to claim 1, wherein 1 to 6% by weight of said additive is used relative to the polysulfide used.

3. A process according to claim 1, wherein 2 to 5% by weight of said additive is used relative to the polysulfide used.

4. A process according to claim 1, wherein at last one additive containing a halogen and at least one additive containing phosphorus are used, the total amount of additive used, by weight, and calculated as elemental halogen and elemental phosphorus relative to the weight of polysulfide, being between 0.1 and 10%.

5. A process according to claim 1, wherein the catalyst treated is a new catalyst, prior to its first use.

* * * * *